United States Patent

Sakumoto

[11] 4,427,161
[45] Jan. 24, 1984

[54] BAIL ARM TURNING DEVICE FOR FISHING SPINNING REEL

[75] Inventor: Akinori Sakumoto, Higashikurume, Japan

[73] Assignee: Daiwa Seiko Inc., Tokyo, Japan

[21] Appl. No.: 376,736

[22] Filed: May 10, 1982

[30] Foreign Application Priority Data

May 29, 1981 [JP] Japan .............................. 56-78559[U]

[51] Int. Cl.³ .............................................. A01K 89/01
[52] U.S. Cl. .......................... 242/84.2 A; 242/84.2 G
[58] Field of Search ..................... 242/84.2 A, 84.2 G, 242/84.21 R, 84.2 A

[56] References Cited

U.S. PATENT DOCUMENTS

| | | | |
|---|---|---|---|
| 2,966,314 | 12/1960 | Monbur | 242/84.21 R |
| 3,095,158 | 6/1963 | Louison | 242/84.21 A |
| 3,342,442 | 9/1967 | Brantingson | 242/84.2 G |
| 4,162,048 | 7/1979 | Sazaki | 242/84.2 G |
| 4,350,312 | 9/1982 | Masclet | 242/84.2 G |

FOREIGN PATENT DOCUMENTS 39-4826 of 1964 Japan .
39-34673 of 1964 Japan .
49-19186 of 1974 Japan .

Primary Examiner—Billy S. Taylor
Attorney, Agent, or Firm—Browdy and Neimark

[57] ABSTRACT

A bail arm turning device for fishing spinning reel, improved to permit an easy turning of a bail arm from winding position to releasing position simply by lifting a lever by the forefinger of the hand holding the rod. The device has a crank rotatably secured to the subtantially mid point of a bail arm attaching member and provided at its end with an elongated hole and at its lower side with a projection. A pin provided on the arm lever fits in the elongated hole. A manipulation lever is disposed at the rear side of the crank attaching portion of the bail arm attaching member, so as to extend at a right angle to the crank shaft. An actuating tab formed to extend downwardly from the manipulation lever faces and abuts the projection of the crank.

2 Claims, 6 Drawing Figures

BAIL ARM TURNING DEVICE FOR FISHING SPINNING REEL

BACKGROUND OF THE INVENTION

The present invention relates to an improved bail arm turning device for a fishing spinning reel.

Hitherto, for turning a bail arm on a spinning reel from the winding position to the releasing position, the fisher directly grasped and manipulated the bail arm by one hand while holding the rod in the other hand. Recently, however, it has been proposed to effect the turning operation by rotating a manipulation lever by a finger of the hand holding the rod. Such arrangements are shown, for example, in Japanese Patent Pulication No. 4826/1964 and Japanese Utility Model Publication No. 34673/1964.

These arrangements, however, suffer a disadvantage that the lever can hardly be manipulated by the forefinger of the hand holding the rod, because the lever is adapted to be swung horizontally toward the fisher.

Japanese Utility Model Publication No. 19186/1974 and the specification of U.S. Pat. No. 3,342,442 disclose devices in which the manipulation lever is arranged to be pulled toward the rod to facilitate the manipulation by the forefinger. In this case, however, the bail arm attaching member accomodates a gear mechanism for actuating the manipulation lever so that the size of the member is increased impractically to deteriorate the balance of rotation of the rotor. In addition, the number of parts is increased to complicate the construction and to require laborious work for assembling. For these reasons, this type of device has not been put into practical use yet.

SUMMARY OF THE INVENTION

Accordingly, it is a primary object of the invention is to provide a bail arm turning device for fishing spinning reel capable of overcoming the above-described problems of the prior art.

To this end, according to one aspect of the invention, there is provided a device for smoothly and easily turning the bail arm of a fishing spinning reel to the fishing line releasing position by pulling a lever upwardly, which is easily performed by the forefinger of the hand holding the rod.

According to another aspect of the invention, there is provided a device for turning the bail arm of fishing spinning reel in which only a manipulation lever and a crank are mounted on the arm attaching member in addition to the ordinary turning mechanism so that the bail arm can easily be turned to the releasing position by pulling of the lever. In consequence, the mass unbalance of the rotor attributable to the increase of size of bail arm attaching member in the lever system incorporating the gear mechanism is avoided to ensure a smooth winding of the fishing line on the reel.

According to a third aspect of the invention, there is provided a lever-operated bail arm turning device in which the number of parts is descreased to simplify the construction and to facilitate the assembling.

The above and other objects, features and advantages of the invention will become clear from the following description of the preferred embodiments taken in conjunction with the accompanying drawings.

DESCRIPTION OF THE PREFERRED EMBODIMENT

Figure 1:
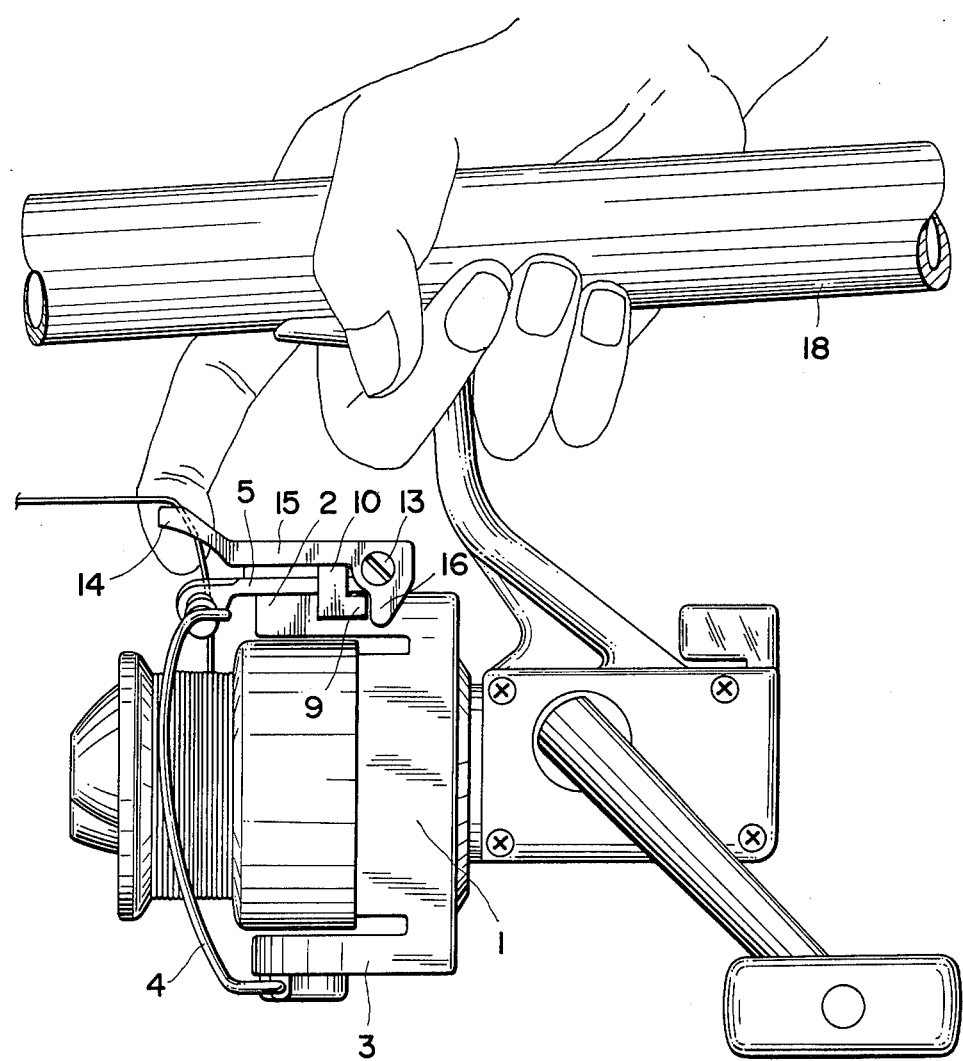
FIG. 1 is a front elevational view of a bail turning device in accordance with an embodiment of in invention.
Figure 2:
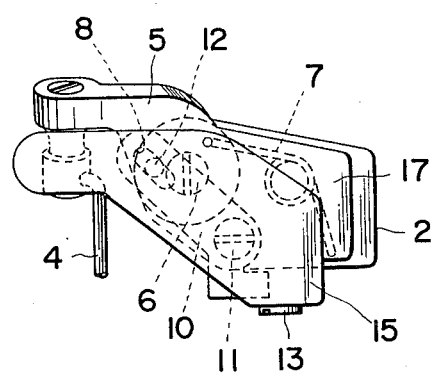
FIG. 2 is a plan view of a bail arm attaching member in the fishing line winding condition in the device shown in FIG. 1.
Figure 3:
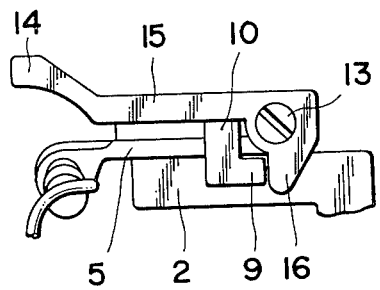
FIG. 3 is a front elevational view of the member shown in FIG. 2.

A preferred embodiment of the invention will be desribed hereinunder with reference to the accompanying drawings.

Bail arm attaching members 2 and 3 are integrally secured to both sides of the rotor 1 of a spinning reel. A bail arm 4 has an arm lever 5 one end of which is rotatably supported on the end of the bail arm attaching member 2 by means of a pin 6, while the other end of the bail arm 4 is carried by the end of the other bail arm attaching member 3. As is well known, the arm lever 5 is biased by a dead point spring 7 mounted in the bail arm attaching member 2 such that it is biased either to the fishing line winding position or fishing line releasing position across the dead point.

A crank 10 is rotatably secured by means of a pin 11 to substantially mid point of one side of the bail arm attaching member 2. The crank 10 is provided at its end with an elongated hole 8 and at the lower side of the opposite or base end thereof with a projection 9. The elongated hole 8 receives a pin 12 projecting from the surface of the arm lever 5. A shaft 13 extending perpendicularly to the shaft 11 is disposed at one side of upper portion of the bail arm attaching member 2 at a position behind the point at which the crank is secured. The shaft 13 rotatably supports a manipulation lever 15 provided at its free end with a manipulating portion 14. An actuating tab 16 is formed to project downwardly from the base portion of the manipulation lever 15. The inner surface of the actuating tab 16 faces and abuts the projection 9 of the crank 10. In the drawings, reference numerals 17 denotes a lid plate for the bail arm attaching member 2, while 18 designates a fishing rod.

Figure 4:
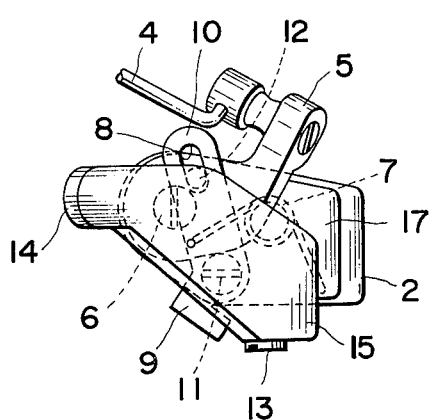
FIG. 4 is a plan view of the bail arm attaching member in the fishing line releasing condition.
Figure 5:
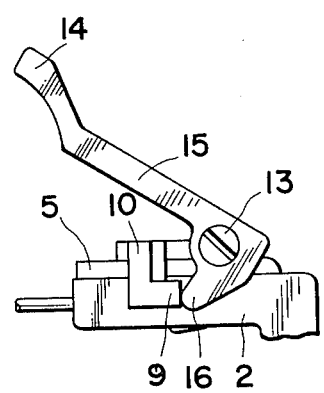
FIG. 5 is a front elevational view of the member shown in FIG. 4.
Figure 6:
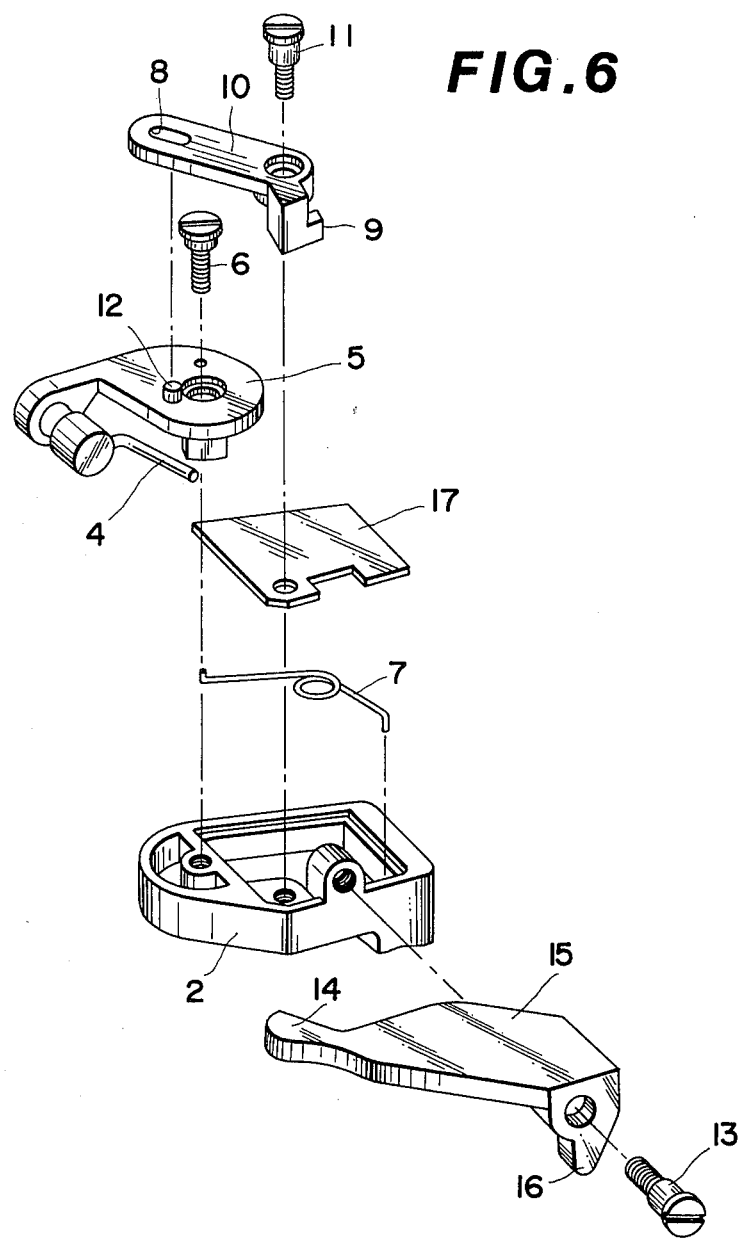
FIG. 6 is an exploded perspective view of major parts of the device in accordance with the invention.

In the device of the embodiment having the described construction, the bail arm 4 can easily be turned from the winding position shown in FIG. 1 to the releasing position simply by lifting the manipulation portion 14 of the manipulation lever 15 by the forefinger of the hand holding the rod 18. By so doing, the actuating tab 16 of the manipulation lever 15 presses the projection 9 of the crank 10 so that the crank 10 is rotated to swing the arm lever 5 against the force of the dead point spring 7 through the action of the pin 12 fitting in the elongated hole 8. As the arm lever 5 is swung beyond the dead point, the arm lever 5 is biased in the direction of swinging and holds the bail arm 4 at the releasing position as shown in FIG. 4.

For returning the bail arm 4 from the releasing position to the winding position, it suffices only to rotate the handle as in the case of the conventional devices.

What is claimed is:

1. In a fishing spinning reel mountable on a fishing rod having a rotor, bail arm attaching members secured in a protruding manner relative to, and forwardly of, said rotor on both sides thereof, an arm lever disposed at one end of a bail arm and rotatably supported at the end of a first of said bail arm attaching members, the other end of said bail arm being supported by a second of said bail arm attaching members, means for resiliently biasing said arm lever between a winding position and a releasing position, said biasing means comprising a dead point spring mounted in said first bail arm attaching member, and a manipulation lever including means for rotatably supporting said manipulation lever on said first bail arm attaching member so that said lever can be pulled in a direction toward said fishing rod, said manipulation lever and said arm lever being connected operatively to each other so that said bail arm can move from the winding position to the releasing position by the pulling of said manipulation lever, the improvement comprising:

a crank including means for rotatably securing said crank to substantially the mid-point of one side of said first bail arm attaching member, said crank being disposed between said arm lever and said manipulation lever, said crank being provided at one end portion with an elongated hole and at an opposite end portion with a projection; a pin projecting from one surface of said arm lever in said direction and fitting into said elongated hole; said manipulation lever supporting means being disposed rearwardly of said crank securing means on said first bail arm attaching member, and extending at right angles thereto; said manipulation lever including an actuating tab formed at one end thereof adjacent said supporting means and said projection of said crank, said actuating tab being rotatably movable about said supporting means into engagement with said crank projection to cause said crank to rotate said arm lever, thereby turning said bail arm, when said manipulation lever is pulled in said direction.

2. The improvement of claim 1, wherein said crank projection and said actuating tab are disposed in substantially the same plane.

* * * * *